(12) United States Patent
Rippert et al.

(10) Patent No.: US 8,464,519 B2
(45) Date of Patent: Jun. 18, 2013

(54) SECONDARY AIR SYSTEM

(75) Inventors: Nils Rippert, Gross-Umstadt (DE); Ramazan Sahan, Pfalzgrafenweiler (DE)

(73) Assignee: Friedrich Boysen GmbH & Co. KG, Altensteig (DE)

(*) Notice: Subject to any disclaimer, the term of this patent is extended or adjusted under 35 U.S.C. 154(b) by 413 days.

(21) Appl. No.: 12/657,819

(22) Filed: Jan. 27, 2010

(65) Prior Publication Data
US 2010/0186396 A1   Jul. 29, 2010

(30) Foreign Application Priority Data
Jan. 28, 2009   (DE) .................... 20 2009 001 007 U

(51) Int. Cl.
*F01N 3/34* (2006.01)

(52) U.S. Cl.
USPC .............................. 60/289; 60/323

(58) Field of Classification Search
USPC .................... 60/289, 300, 305, 323, 324
See application file for complete search history.

(56) References Cited

U.S. PATENT DOCUMENTS

| | | | | |
|---|---|---|---|---|
| 3,522,702 A | * | 8/1970 | Grosseau | 60/305 |
| 4,023,361 A | * | 5/1977 | Kojima | 60/302 |
| 5,768,890 A | | 6/1998 | Bekkering et al. | |
| 7,243,490 B2 | * | 7/2007 | Yoshida et al. | 60/305 |
| 7,454,899 B2 | * | 11/2008 | Jinda | 60/289 |
| 7,597,081 B2 | * | 10/2009 | Aw | 123/193.5 |
| 2006/0021336 A1 | | 2/2006 | Kokubo et al. | |
| 2007/0095055 A1 | | 5/2007 | Jinda | |
| 2008/0265524 A1 | | 10/2008 | Mori | |

FOREIGN PATENT DOCUMENTS

| | | |
|---|---|---|
| DE | 198 32 627 A1 | 1/2000 |
| DE | 100 16 390 | 10/2001 |
| DE | 102 32 910 B4 | 8/2005 |
| JP | 2004162682 A | 5/2004 |
| JP | 2005-201218 A | 7/2005 |
| JP | 2006-200379 A | 8/2006 |
| WO | WO 00/25006 A1 | 5/2000 |
| WO | WO 2004/111403 A1 | 12/2004 |

* cited by examiner

*Primary Examiner* — Kenneth Bomberg
*Assistant Examiner* — Dapinder Singh
(74) *Attorney, Agent, or Firm* — Kilpatrick Townsend & Stockton LLP

(57) ABSTRACT

A secondary air system for the supply of secondary air into at least one exhaust gas outlet passage of a cylinder head of an internal combustion engine, wherein at least one secondary air passage provided in the cylinder head is associated with the exhaust gas outlet passage and opens into the exhaust gas outlet passage and into an outer connection surface of the cylinder head. A base plate is provided which can be placed onto the connection surface of the cylinder head and which is provided with secondary air stubs which each engage into a secondary air passage when the base plate is in place. The base plate is provided on its outer side remote from the connection side with at least one hood via which the supplied secondary air is distributed to a plurality of secondary air stubs.

16 Claims, 3 Drawing Sheets

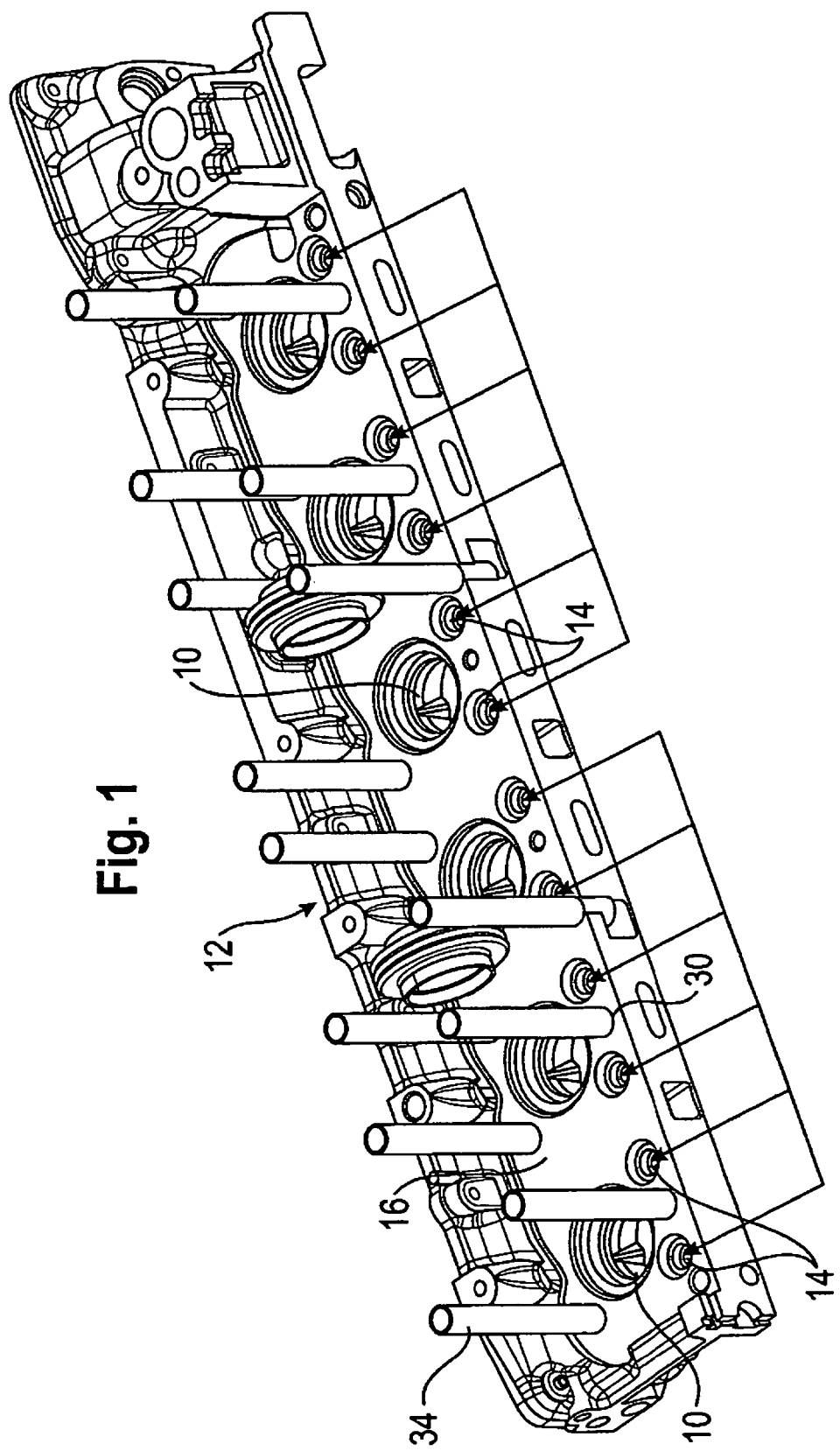

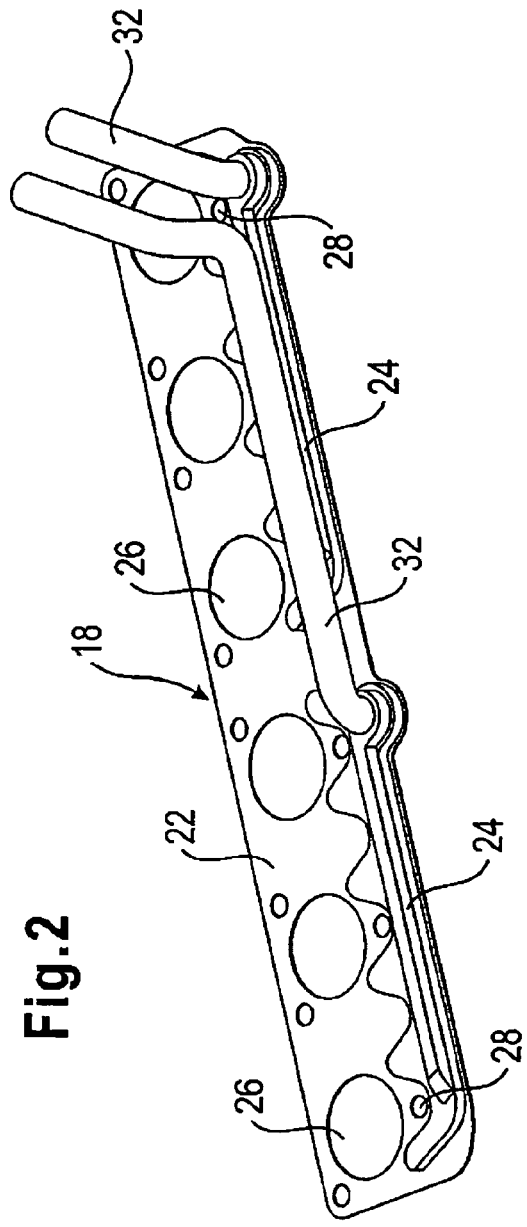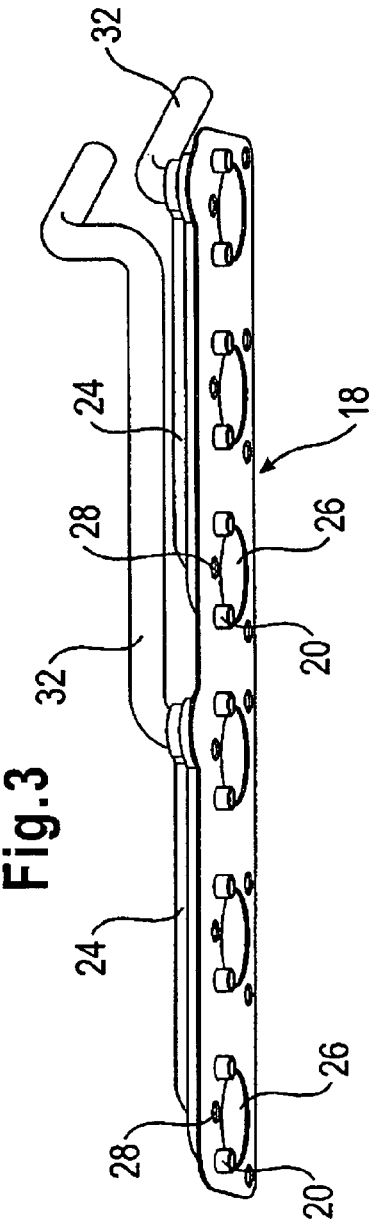

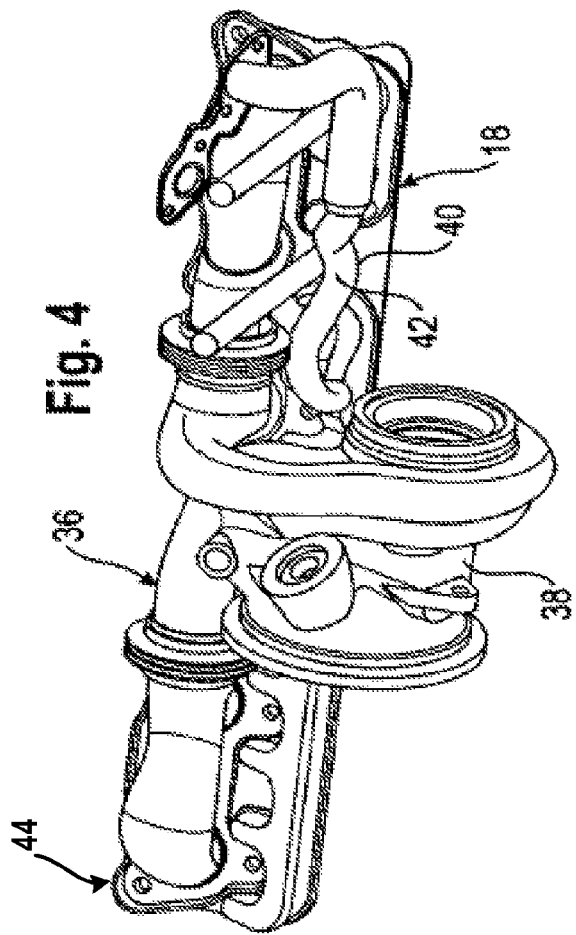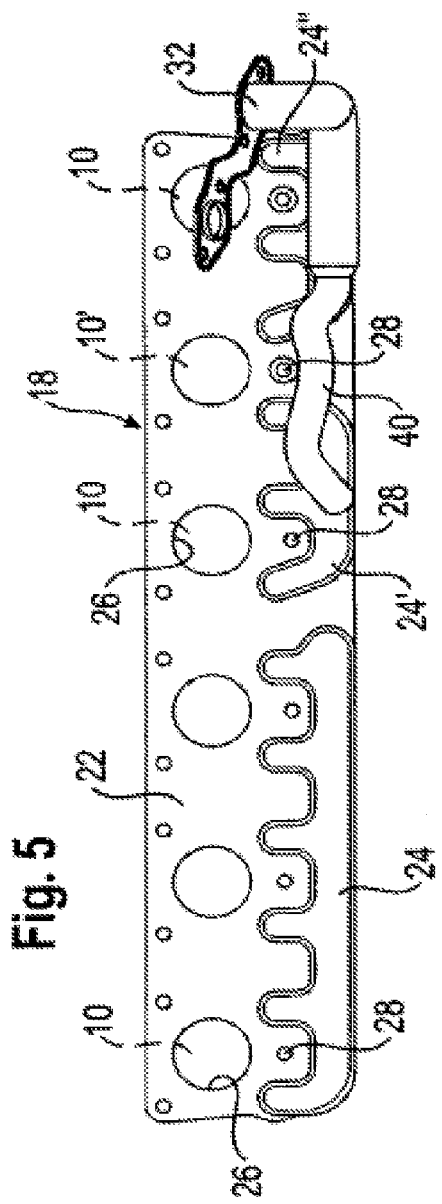

SECONDARY AIR SYSTEM

This application claims priority to German Application No. 20 2009 001 007.4, filed Jan. 28, 2009, the disclosure of which is incorporated herein by reference.

The invention relates to a secondary air system for the supply of secondary air into at least one exhaust gas outlet passage of a cylinder head of an internal combustion engine, in particular of a motor vehicle engine, wherein at least one secondary air passage provided in the cylinder head is associated with the exhaust gas outlet passage and opens into the exhaust gas outlet passage, on the one hand, and into an outer connection surface of the cylinder head, on the other hand.

It is known to enable a post-reaction of fuel components present in the exhaust gas by a secondary air injection in the exhaust gas duct. Such a secondary air injection is in particular of advantage in combination with a catalytic post-treatment. The warm-up time up to the reaching of the operating temperature of the catalytic converter can thus be considerably shortened using a secondary air injection. To allow a secondary air insertion which is as large as possible, two secondary air passages are in the meantime preferably associated with a respective exhaust gas outlet passage. The injection of secondary air previously took place via a longitudinal pipe having individual stubs, with the pipe also being supported accordingly via these individual stubs. Secondary air was previously distributed via the pipes or in the cylinder head.

Secondary air is indispensable, for example due to the SULEV requirements (SULEV=super ultra low emission vehicle), in particular on the use of turbochargers. There is thus a large temperature difference there, whereby the start-up of the catalytic converter is at least made difficult. If now secondary air should be introduced into the exhaust gas outlet passages in that, for example, the number of the secondary air passages opening into them is increased, problems can result, in particular in connection with the secondary air distribution.

It is the underlying object of the invention to provide an improved secondary air system of the initially named kind. In this respect, this secondary air system with a simple design should in particular also be suitable for the supply of the exhaust gas passages with secondary air via a larger number of secondary air passages.

In accordance with the invention, this object is satisfied by a base plate which can be placed onto the connection surface of the cylinder head, which is provided with secondary air stubs, which respectively engage into a secondary air passage when the base plate is in place, and the base plate being provided on its outer side remote from the connection surface with at least one hood via which supplied secondary air is respectively distributed onto a plurality of secondary air stubs.

Due to this design, an ideal secondary air supply of the exhaust gas outlet passages is above all also ensured, with a minimal effort, when the secondary air is in each case supplied to them via at least two secondary air passages provided in the cylinder head.

A preferred embodiment of the secondary air system in accordance with the invention is correspondingly characterized in that at least two secondary air passages provided in the cylinder head are associated with at least one exhaust gas outlet passage and in that supplied secondary air is distributed over the secondary air stubs engaging into these secondary passages via a common hood.

It is in particular also of advantage if in each case at least one secondary air passage and preferably in each case at least two secondary air passages provided in the cylinder head are associated with at least two exhaust gas outlet passages and supplied secondary air is distributed over the secondary air stubs engaging into the respective secondary passages via a common hood.

A hood is therefore in each case associated with at least two secondary air passages provided in the cylinder head, with it in particular also being able to be provided as a common hood for secondary air passages associated with different exhaust gas outlet passages. It is admittedly generally also conceivable that a respective hood is only associated with the second air passages provided for an exhaust gas outlet passage; however, a hood is preferably respectively provided for the secondary air supply of a plurality of exhaust gas outlet passages.

In accordance with an expedient practical embodiment, a plurality of hoods are provided via which respectively supplied secondary air is distributed over a plurality of secondary air stubs respectively engaging into a secondary air passage. At least two respective exhaust gas outlet passages are preferably jointly supplied with secondary air.

If a plurality of hoods are provided, the respective same number of exhaust gas outlet passages can be jointly supplied with secondary air via them. Alternatively, however, it is also possible to supply a different number of exhaust gas outlet passages jointly in each case at least partly with secondary air via the hoods.

The secondary air stubs can in particular be shaped at the base plate, soldered to the base plate or in each case be formed as a drawn part, that is in particular pressed or drawn. Soldering brings about the advantage of smaller deformation, for example, with respect to welding.

A respective hood can in particular be soldered to the base plate.

With the exhaust gas outlet passages opening into the connection surface of the cylinder head, the base plate is expediently provided with passage openings which are aligned with the respective exhaust gas outlet openings of the cylinder head when the base plate is in place.

The base plate can preferably be attached to the connection surface of the cylinder head jointly with an exhaust manifold. In this respect, the base plate is preferably arranged between an exhaust manifold flange and the connection surface in the assembled state.

The base plate can advantageously be screwed to the cylinder head jointly with the exhaust manifold. In this respect, the base plate is preferably provided with screw openings which are aligned with screw bores provided in the connection surface of the cylinder head. The screw openings are in this respect arranged outside the hood region so that a respective access for the screws for the fastening to the cylinder head is ensured.

The exhaust manifold can in particular be preassembled on the base plate in the case of a multi-part exhaust manifold. In this respect, the exhaust manifold or a part thereof can, for example, also be formed integrally with a part of the compressor housing of a turbocharger. The base plate can thus also be provided as an installation aid for the preassembly of a multi-part exhaust manifold.

A respective secondary air supply pipe expediently opens into a respective hood. Since a plurality of secondary air passages are supplied with secondary air via such a hood, a single secondary air supply pipe is sufficient for the supply of these secondary air passages. It is, for example, also conceivable to connect in particular two adjacent hoods to one another via an intermediate pipe.

The secondary air can include fresh air and/or returned exhaust gas. Generally, an exhaust gas backwash is also possible.

An assembly of the base plate only by soldering is also conceivable, for example, which is particularly cost effective.

The connection to the cylinder head must be airtight so that no air loss occurs. The air inlets can be combined in accordance with the ignition sequence of the internal combustion engine. A seal is preferably provided between the secondary air stub and the cylinder head to ensure a sealed secondary air supply via the secondary air stub.

As already mentioned, the base plate can be received into the screw connection points of the exhaust manifold. In this respect, it is expediently pressed toward the cylinder head via the exhaust manifold.

It is, for example, conceivable as an additional function of the base plate that it also serves as a support for cast manifolds (sliding movement) and/or as transport security for manifold modules, in particular including a flexible decoupling element.

The secondary air passages expediently open in each case in the region behind the respective outlet valve in its proximity into the respective exhaust gas outlet passage.

The invention will be explained in more detail in the following with reference to embodiments and to the drawing; there are shown in this:

FIG. 1 a schematic perspective partial representation of an exemplary embodiment of a cylinder head of an internal combustion engine with exhaust gas passages opening into a connection surface:

FIG. 2 a schematic perspective view of an exemplary embodiment of a base plate which can be placed onto the connection surface of the cylinder head in accordance with FIG. 1:

FIG. 3 a schematic view of the base plate in accordance with FIG. 2 from below;

FIG. 4 a schematic perspective view of a further embodiment of the base plate with a multi-part exhaust manifold preassembled thereon; and FIG. 5 a schematic plan view of the base plate in accordance with FIG. 4 without an exhaust manifold.

FIGS. 1 to 3 show an exemplary embodiment of the secondary air system in accordance with the invention. Generally, such a secondary air supply system can be provided for the supply of secondary air into at least one exhaust gas outlet passage 10 of a cylinder head 12 of an internal combustion engine, in particular of a motor vehicle engine, wherein at least one secondary air passage 14 provided in the cylinder head 12 is associated with the exhaust gas outlet passage 10 and opens into the exhaust gas outlet passage 10, on the one hand, and into an outer connection surface 16 of the cylinder head 12, on the other hand.

FIG. 1 shows, in a schematic perspective representation, an exemplary embodiment of the cylinder head 12 of an internal combustion engine with, for example, six exhaust gas outlet passages 10 opening into the connection surface 16. Generally, however, any other desired number of exhaust gas outlet passages 10 can also be provided.

FIG. 2 shows, in a schematic perspective view, an exemplary embodiment of the base plate 18 which can be placed onto the connection surface 16 of the cylinder head 12 in accordance with FIG. 1. This base plate 18 is reproduced in a schematic view from below in FIG. 3.

As can be recognized with reference to FIG. 3, the base plate 18 is provided with secondary air stubs 20 which engage in each case into a secondary air passage 14 when the base plate 18 is placed onto the connection surface 16 of the cylinder head 12 and is aligned with it. As can in particular also be recognized with reference to FIG. 2, the base plate 18 can be provided on its outer side 22 remote from the connection surface 16 with at least one hood 24 via which supplied secondary air is respectively distributed over a plurality of secondary air stubs 20.

At least two secondary air passages 14 provided in the cylinder head 12 can be associated with at least one exhaust gas outlet passage 10 to supply said exhaust gas outlet passage 10 with sufficient secondary air. Supplied secondary air can be distributed over the secondary air stubs 20 engaging into said secondary air passages 14 via a common hood 24.

As can be recognized with respect to FIG. 1, at least two respective secondary air passages can be associated with each exhaust gas outlet passage 20 and secondary air is respectively supplied to them via a common hood 24 (cf. also FIGS. 2 and 3).

In this respect, in particular also at least two exhaust gas outlet passages 10 can be supplied with secondary air through the associated secondary air passages 14 via a common hood 24.

In particular a plurality of hoods 24 can be provided via which respectively supplied secondary air is distributed over a plurality of secondary air stubs 20 respectively engaging into a secondary air passage 14. In this respect, at least two exhaust gas outlet passages 10 can in each case also be jointly supplied with secondary air via the hoods 24. The respective same number of exhaust gas outlet passages 10 can in this respect be supplied jointly with secondary air via the hoods 24. Generally, however it is also conceivable to supply a different number of exhaust gas outlet passages 10 jointly in each case at least partly with secondary air via the hoods 24.

In the present embodiment reproduced in FIGS. 1 to 3, two respective secondary air passages 14 provided in the cylinder head 12 are associated with the exhaust gas outlet passages 10, six here, for example. In addition, in the present case, three respective exhaust gas outlet passages 10 are supplied with secondary air via the respective six secondary air passages 14 via a common hood 24. In the present case, two such hoods 24 are therefore provided which are each associated with three exhaust gas outlet passages 10. In the present case, the respective same number of exhaust gas outlet passages 12 is therefore provided jointly with secondary air via the two hoods 24.

The secondary air stubs 20 can be shaped at the base plate 18, soldered to the base plate 18 or in each case be formed as a drawn part.

A respective hood 24 can in particular be soldered to the base plate 18.

As can be recognized with reference to FIG. 1, the exhaust gas outlet passages 10 open into the connection surface 16 of the cylinder head 12. The base plate 18 can now be provided with passage openings 2 (cf. FIGS. 2 and 3) which are aligned with the respective exhaust gas outlet openings of the cylinder head 12 when the base plate 18 is in place.

The base plate 18 can in addition be provided with screw openings 28 (cf. again FIGS. 2 and 3) which are aligned with screw bores 30 of the cylinder head 12 opening into the connection surface 16 of the cylinder head 12 when the base plate 18 is placed onto the connection surface 16. In this respect, as can in particular be recognized with reference to FIG. 2, the hoods 24 are designed so that the screw openings 30 are arranged outside the hood region and the access for a screw connection with the cylinder head 12 is correspondingly ensured.

As can in particular again be recognized with reference to FIGS. 2 and 3, a respective secondary air supply pipe 32 can open into each hood 24.

The secondary air can additionally include fresh air and/or returned exhaust gas.

In the present embodiment, the supply of secondary air therefore takes place in two groups of six secondary air passages 14 each. The base plate 18 in the present case is therefore provided, for example, with twelve secondary air stubs 20 (cf. FIG. 3).

The base plate 18 can be received in the screw connection points of the exhaust manifold due to the screw openings 28, with it being able to be pressed toward the cylinder head 20 via the manifold.

In the representation in accordance with FIG. 1, adjustment sleeves 34 inserted into the screw bores 30 of the cylinder head 12 can be recognized.

The base plate 18 can, for example, also satisfy the function of a support for cast manifolds (sliding movement) and/or of transport security for manifold modules, including a flexible electronic fuel injection device.

FIG. 4 shows, in a schematic perspective representation, a further exemplary embodiment of the base plate 18 with a multi-part exhaust manifold 36 preassembled on it. In this respect, this exhaust manifold 36 or a part thereof can be formed, for example, integrally with a part of the compressor housing 38 of a turbocharger.

FIG. 5 shows, in a schematic plan view, the base plate 18 in accordance with FIG. 4 without exhaust manifold.

In this embodiment reproduced in FIGS. 4 and 5, a different number of exhaust gas outlet passages 10 are supplied jointly in each case at least partly with secondary air via the hoods 24. In this respect, in the present case, three hoods 24, 24', 24" are provided, for example, of which one (24) again distributes secondary air to six secondary air stubs 20 (cf. also FIG. 3) and correspondingly three exhaust gas outlet passages 10, whereas in each case secondary air is distributed over three secondary air stubs 20 via the two other hoods 24', 24". In this respect, as can be recognized with reference to FIG. 5, the respective two secondary air stubs 20 associated with an exhaust gas outlet passage 10 and a secondary air stub 20 associated with a further exhaust gas outlet passage 10' are supplied with secondary air via these two last-named hoods 24', 24". In this respect, an exhaust gas outlet passage 10' is therefore supplied with secondary air both via the one hood 24' and via the other hood 24", with it being in communication with the one hood 24' via a first secondary air passage 14 (see also FIG. 1) and to the other hood 24" via a second secondary air passage 14.

The two hoods 24', 24" respectively associated with only three secondary air passages 14 can be connected to one another via an intermediate pipe 40. It is thus sufficient if one of these two hoods 24 is supplied with secondary air via a secondary air supply pipe 32.

A restricted passage 42 between the compressor housing of a turbocharger and a screw connection access can be taken into account, for example, by such an embodiment.

In another respect, the present embodiment can again be designed at least substantially the same as the previously described embodiment. Parts corresponding to one another have the same reference numerals associated with them.

| Reference numeral list | |
|---|---|
| 10 | exhaust gas outlet passage |
| 10' | exhaust gas outlet passage |
| 12 | cylinder head |
| 14 | secondary air passage |
| 16 | connection surface |
| 18 | base plate |
| 20 | secondary air stub |

| Reference numeral list | |
|---|---|
| 22 | outer side |
| 24 | hood |
| 24' | hood |
| 24" | hood |
| 26 | passage opening |
| 28 | screw opening |
| 30 | screw bore |
| 32 | secondary air supply pipe |
| 34 | adjustment pipe |
| 36 | exhaust manifold |
| 38 | part of a compressor housing |
| 40 | intermediate pipe |
| 42 | restricted passage |

The invention claimed is:

1. A secondary air system for supply of secondary air into an internal combustion engine of a motor vehicle engine, the system comprising:
a cylinder head having at least one exhaust gas outlet passage, at least one secondary air passage provided in the cylinder head is associated with the at least one exhaust gas outlet passage and opens into the exhaust gas outlet passage, and opens into an outer connection surface of the cylinder head,
a base plate which that can be placed onto the connection surface of the cylinder head having a plurality of secondary air stubs each of which engage into a secondary air passage of the at least one secondary air passage when the base plate is in place on the connection surface, the base plate having an outer side away from the connection side having at least one hood through which the supplied secondary air is distributed to the plurality of secondary air stubs.

2. A secondary air system in accordance with claim 1, wherein the at least one secondary air passage comprises at least two secondary air passages provided in the cylinder head associated with each of the at least one exhaust gas outlet passage, and wherein the supplied secondary air is distributed over the secondary air stubs engaged within the at least two secondary passages through a common hood of the at least one hood.

3. A secondary air system in accordance with claim 1, wherein the at least one exhaust gas outlet passage comprises at least two exhaust gas outlet passages and wherein the at least one secondary air passage comprises at least two respective secondary air passages associated with the at least two exhaust gas outlet passages and configured such that the supplied secondary air is distributed over the plurality of secondary air stubs engaged within the respective secondary air passages through the common hood.

4. A secondary air system in accordance with claim 1, further comprising:
a plurality of hoods through which the supplied secondary air is distributed over the plurality of secondary air stubs respectively engaging into the at least one secondary air passage.

5. A secondary air system in accordance with claim 4, wherein the at least one exhaust gas outlet passage comprises at least two respective exhaust gas outlet passages that are jointly supplied with secondary air through the plurality of hoods.

6. A secondary air system in accordance with claim 4, wherein a number of exhaust gas outlet passages jointly supplied with secondary air through each of the plurality of hoods are respectively the same.

7. A secondary air system in accordance with claim 4, characterized in that a different number of exhaust gas outlet passages is supplied jointly in each case at least partly with secondary air through each of the plurality of hoods.

8. A secondary air system in accordance with claim 1, wherein each of the secondary air stubs are shaped at the base plate, soldered to the base plate or are in each case formed as a drawn part.

9. A secondary air system in accordance with claim 1, wherein a respective hood of the plurality of hoods is soldered to the base plate.

10. A secondary air system in accordance with claim 1, wherein the at least one exhaust gas outlet passages comprises exhaust gas outlet passages, wherein each of the exhaust gas outlet passages open into the connection surface of the cylinder head, and wherein the base plate is provided with passage openings that are aligned with the respective exhaust gas outlet openings of the cylinder head when the base plate is in place.

11. A secondary air system in accordance with claim 1, wherein the base plate can be attached to the connection surface of the cylinder head jointly with an exhaust manifold with the base plate being arranged between an exhaust manifold flange and the connection surface in an assembled state.

12. A secondary air system in accordance with claim 11, wherein the base plate can be screwed to the cylinder head jointly with the exhaust manifold.

13. A secondary air system in accordance with claim 12, wherein the base plate is provided with screw openings which are aligned with screw openings opening into the connection surface of the cylinder head, with the screw openings being arranged outside the at least one hood.

14. A secondary air system in accordance with claim 1, further comprising:
an exhaust manifold comprising a multi-part exhaust manifold preassembled on the base plate.

15. A secondary air system in accordance with claim 1, further comprising:
a secondary air supply pipe that opens into a respective hood of the at least one hood.

16. A secondary air system in accordance with claim 1, wherein the secondary air includes fresh air and/or returned exhaust gas.

* * * * *